(12) United States Patent
Springer et al.

(10) Patent No.: US 6,238,163 B1
(45) Date of Patent: *May 29, 2001

(54) VEHICLE RESTRAINING DEVICE

(75) Inventors: Scott L. Springer, Milwaukee; Norbert Hahn, Franklin, both of WI (US)

(73) Assignee: Rite-Hite Holding Corporation, Milwaukee, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/867,178

(22) Filed: Jun. 2, 1997

Related U.S. Application Data

(63) Continuation of application No. 08/570,078, filed on Dec. 11, 1995, now abandoned, which is a continuation of application No. 08/310,674, filed on Sep. 22, 1994, now abandoned, which is a division of application No. 08/008,757, filed on Jan. 25, 1993, now Pat. No. 5,375,965.

(51) Int. Cl.[7] .................................................. B65G 67/02
(52) U.S. Cl. ......................................... 414/401; 414/584
(58) Field of Search .................................... 410/9, 19, 30, 410/49; 188/32, 36; 414/401, 584, 396

(56) References Cited

U.S. PATENT DOCUMENTS

| Re. 32,968 | 6/1989 | Hahn .................................... 414/401 |
| Re. 33,154 | 1/1990 | Hahn et al. ........................... 414/401 |
| Re. 33,242 | 6/1990 | Hipp et al. ............................ 414/401 |
| 1,102,773 | 7/1914 | Martin . |
| 2,413,744 | 1/1947 | Carter ................................... 280/179 |

(List continued on next page.)

FOREIGN PATENT DOCUMENTS

| 1308222 | 8/1988 | (CA) | ............................ B65G/67/00 |
| 583404 | 9/1933 | (DE) . | |
| 27 35 826 | 2/1979 | (DE) | ............................ B65G/69/28 |
| 3830891A1 | 3/1990 | (DE) . | |
| 42 42 415 | 2/1994 | (DE) | ............................ B65G/69/28 |

(List continued on next page.)

OTHER PUBLICATIONS

"Notice Technique CDC 4000" (French and English versions).

"Equipements Servoquai" brochure published by Michel Roux starting in Mar., 1991 or earlier, and translation, 5 pages.

"Les Hommes, Les Vehicules, Le Quai" brochure published by Michel Roux starting in Nov., 1991 or earlier, and translation, 20 pages.

Photographs published by Michel Roux in 1991, 6 pages, 12 Photographs Total.

"Descriptif Technique, Descriptif de Fonctionnement, & Caracteristiques Techniques" brochure published by Michel Roux starting in Oct., 1991 or earlier, and translation, 8 pages.

(List continued on next page.)

*Primary Examiner*—Stephen T. Gordon
(74) *Attorney, Agent, or Firm*—Marshall, O'Toole, Gerstein, Murray & Borun

(57) ABSTRACT

A device for restraining a truck from movement during the loading and unloading thereof while the truck is parked in a driveway in a loading dock. The truck restraining device has a lock assembly comprising a base and a locking arm pivotally mounted to the base for rotating between retracted and extended positions. In the retracted position, the locking arm is substantially horizontal for permitting the truck to drive over the restraining device whereas, in the extended position, the locking arm extends upwardly for engaging the truck wheels for restraining movement of the truck.

5 Claims, 8 Drawing Sheets

U.S. PATENT DOCUMENTS

| | | | |
|---|---|---|---|
| 2,773,564 | 12/1956 | Garard, Sr. | 188/32 |
| 3,110,466 | 11/1963 | O'Sullivan | 248/119 |
| 3,221,907 | 12/1965 | O'Sullivan | 188/32 X |
| 3,305,049 | 2/1967 | Willey | 188/32 |
| 3,447,639 | 6/1969 | Parr | 185/32 |
| 3,542,157 | 11/1970 | Noah | 188/32 |
| 3,666,118 | 5/1972 | Raynes et al. | 414/401 |
| 3,667,160 | 6/1972 | Salloum . | |
| 4,013,145 | 3/1977 | Mumm | 188/32 |
| 4,024,820 | 5/1977 | Hlinsky et al. . | |
| 4,122,629 | 10/1978 | Rennick | 188/32 X |
| 4,146,888 | 3/1979 | Grunewald et al. | 340/679 |
| 4,191,503 | 3/1980 | Neff et al. | 414/401 |
| 4,207,019 | 6/1980 | Cone | 414/373 |
| 4,208,161 | 6/1980 | Hipp et al. | 414/401 |
| 4,216,724 | 8/1980 | Grillet . | |
| 4,264,259 | 4/1981 | Hipp | 414/401 |
| 4,267,748 | 5/1981 | Grunewald et al. | 74/529 |
| 4,282,621 | 8/1981 | Anthony et al. | 14/71.1 |
| 4,373,847 | 2/1983 | Hipp et al. | 414/401 |
| 4,379,354 | 4/1983 | Hahn et al. | 14/71.3 |
| 4,443,150 | 4/1984 | Hahn et al. | 414/401 |
| 4,472,099 | 9/1984 | Hahn et al. | 414/401 |
| 4,560,315 | 12/1985 | Hahn | 414/401 |
| 4,572,080 | 2/1986 | Williams et al. | 104/252 |
| 4,605,353 | 8/1986 | Hahn et al. | 414/401 |
| 4,634,334 | 1/1987 | Hahn et al. | 414/401 |
| 4,653,967 | 3/1987 | Isaksson et al. | 410/30 X |
| 4,674,941 | 6/1987 | Hageman | 414/401 |
| 4,676,344 | 6/1987 | Locicero | 188/32 |
| 4,695,216 | 9/1987 | Erlandsson | 414/401 |
| 4,728,242 | 3/1988 | Erlandsson | 414/401 |
| 4,759,678 | 7/1988 | Hageman | 414/401 |
| 4,765,792 | 8/1988 | Cherry et al. | 414/401 |
| 4,767,254 | 8/1988 | Kovach et al. | 414/401 |
| 4,784,567 | 11/1988 | Hageman et al. | 414/401 |
| 4,815,918 | 3/1989 | Bennett et al. | 414/401 |
| 4,861,217 | 8/1989 | Erlandsson | 414/401 |
| 4,865,508 | 9/1989 | Carlson | 414/401 |
| 4,915,568 | 4/1990 | West | 414/401 |
| 4,938,647 | 7/1990 | Erlandsson | 414/401 |
| 4,963,068 | 10/1990 | Gelder | 414/401 |
| 4,969,792 | 11/1990 | Ellis et al. | 414/401 |
| 4,973,213 | 11/1990 | Erlandsson | 414/401 |
| 5,096,021 | 3/1992 | Tart . | |
| 5,249,905 | 10/1993 | Warner et al. | 414/401 |
| 5,302,063 | 4/1994 | Winsor | 410/49 X |
| 5,375,965 | 12/1994 | Springer et al. | 414/401 X |

FOREIGN PATENT DOCUMENTS

| | | | |
|---|---|---|---|
| 0 302 356 A1 | 7/1988 | (EP) | B65G/69/24 |
| 0 384 850 A1 | 8/1990 | (EP) | B65G/67/02 |
| 0537075A1 | 4/1993 | (EP) . | |
| 0 580 415 A1 | 1/1994 | (EP) | B65G/69/00 |
| 0 639 488 A1 | 2/1995 | (EP) | B60T/3/00 |
| 0 537 075 B1 | 4/1995 | (EP) | B65G/67/02 |
| 2 284 481 | 4/1976 | (FR) | B60P/7/08 |
| 2394423 | 2/1979 | (FR) | 188/32 |
| 2 652 340 | 3/1991 | (FR) | B65G/67/54 |
| 2652340 | 3/1991 | (FR) . | |
| 2 672 578 | 8/1992 | (FR) | B65G/69/28 |
| 2 682 343 | 4/1993 | (FR) | B60T/3/00 |
| 2 689 845 | 10/1993 | (FR) | B60T/3/00 |
| 526008 | 2/1958 | (IT) . | |
| 60-36230 | 3/1985 | (JP) . | |
| 0157253 | 7/1978 | (NL) | 410/30 |
| 1036593 | 8/1983 | (SU) | 188/32 |
| WO 9518029 | 7/1995 | (WO) | B60T/1/14 |

OTHER PUBLICATIONS

"Amenagement de Quais Industriels" brochure published by Michel Roux starting in Nov., 1991 or earlier, and translation, 2 pages.

"Calage Automatique" brochure published collectively with the "Amenagement de Quais Industriels" brochure by Michel Rouxx starting in Mar., 1992 or earlier, and translation, 2 pages.

Brochure re Combar product (German) 4 pages, pre 11/96.

5 color photographs of Combar product, pre 11/96.

4 page Dyna Seal brochure of Wheelblocker with translation.

4 page Dyna Seal brochure of Wheelblocker.

4 pages from German publication *Barrometer* dated Nov. 1994.

5 pages of German Info Bulletin—"Stertil"—Combilok–Vrachtwagenblockkering.

7 photographs of the Auto Chock installation at the Ford Detroit Parts Facility believed to have been taken in Jun. 1991.

2–page brochure, "Kelley Auto Chock Truck Restraint".

4–pages of brochure re "Combar" product (in German).

2 pages of blueprints (reduced in size) of Pentalift.

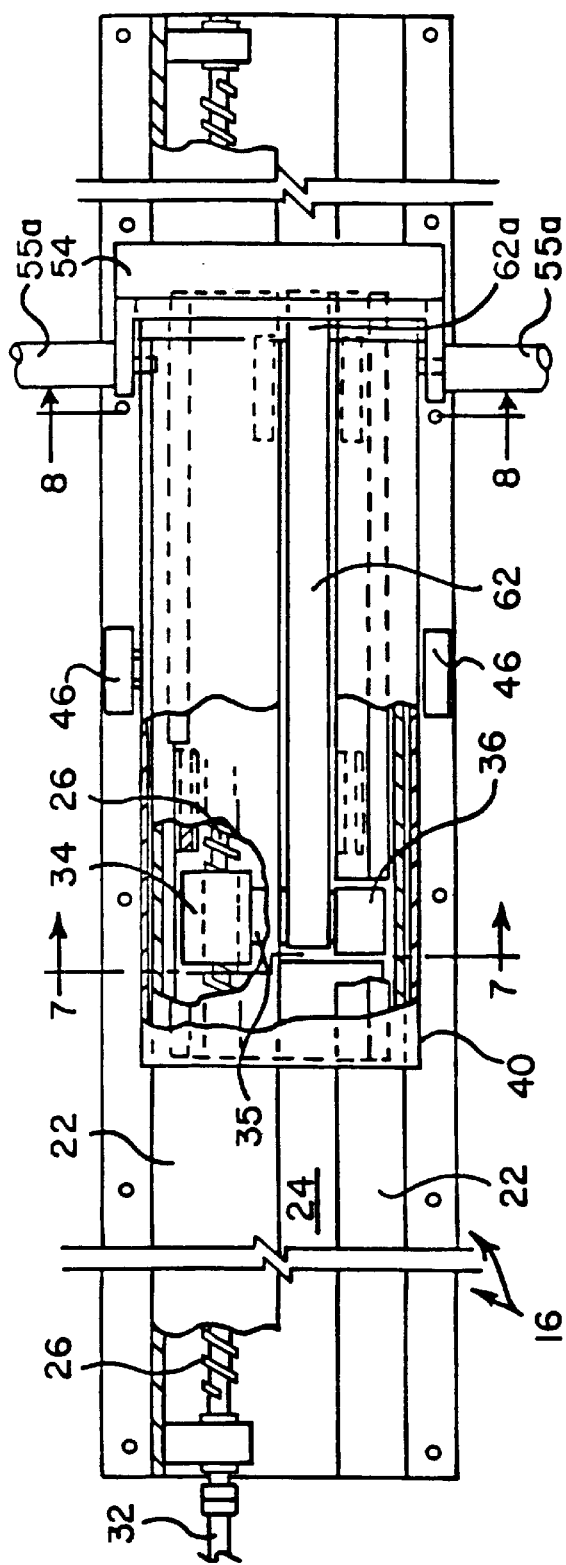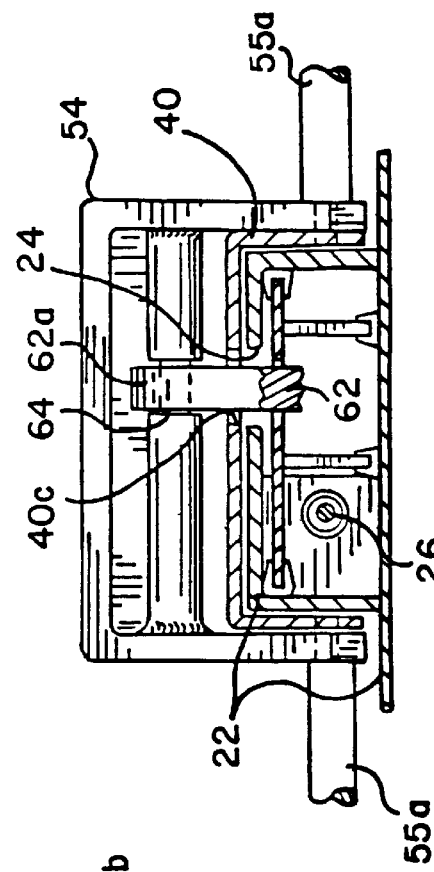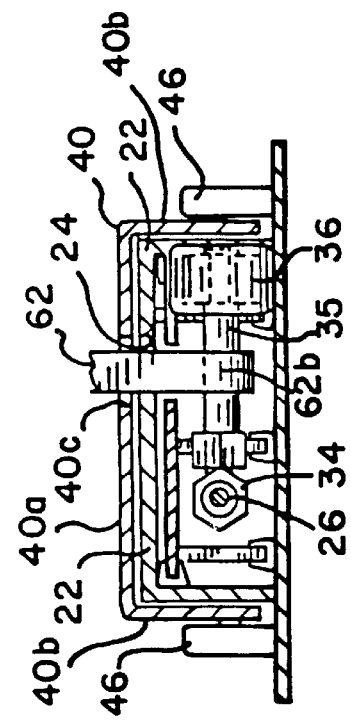

VEHICLE RESTRAINING DEVICE

This application is a continuation of 08,570,078 filed Dec. 11, 1995 which is a continuation of 08,310,674, filed Sep. 22, 1994, both now abandoned, which is a divisional of 08,008,757 filed Jan. 25, 1993 now U.S. Pat. No. 5,375,965.

FIELD OF THE INVENTION

The present invention relates to a device for restraining a vehicle from movement from the parked position during the loading and unloading operation at a loading dock.

BACKGROUND OF THE INVENTION

In the loading and unloading of vehicles parked adjacent a loading dock, heavy equipment such as forklifts and the like are used to facilitate and expedite the loading and unloading operation. It is imperative that the vehicle remain in a fixed abutting position relative to the loading dock to prevent serious accidents to both personnel and equipment. Without proper securement, there is a real potential hazard that the equipment will cause the vehicle to inadvertently move away from the loading dock during the loading or unloading operation so that equipment may be damaged or personnel may be injured.

Previous attempts to employ roadway mounted restraints to prevent the vehicle from prematurely moving away from the loading dock have been largely unsuccessful or have had several shortcomings. Attempts to place wheel blocks underneath and wedged in front of the vehicle's wheels have been unsuccessful because (1) the blocks are easily lost or damaged, (2) the blocks may not operate effectively due to a slippery road surface from oil, rain, ice or snow, (3) the blocks are awkward to handle and sometimes difficult to remove from the wedged position; (4) the blocks require the dock personnel manipulating the device to be located on the roadway adjacent the dock; thus, care must be exercised by the personnel to avoid being injured by the vehicle. Other attempts to utilize various locking mechanisms to obtain proper securement to the loading dock have had one or more of the following problems: (1) they are incapable of being utilized with a wide variety of truck vehicle designs; (2) they rely on the presence and structural integrity of the vehicle ICC bumper, which may be missing, damaged, or of insufficient strength to restrict vehicle motion; (3) they frequently require substantial structural modifications to the dock facility and are costly to install; (4) often times they are awkward, difficult and time consuming to engage and disengage from the vehicle parked at the dock; and (5) the location of the mechanism at the loading dock interferes with the normal operation of the loading equipment during the loading and unloading operations.

OBJECTS AND SUMMARY OF THE INVENTION

Thus, it is an object of the invention to provide a truck restraining device which is not beset with the shortcomings associated with prior devices.

It is an object of the invention to provide a device which is capable of accommodating vehicles of widely varying configurations and sizes.

It is another object of the invention to provide a device which can restrain a vehicle without an ICC bumper.

A further object of the invention is to provide a device which is compact and has a low profile for accommodating vehicles having low undercarriages.

Another object of the invention is to provide a device which may be readily installed in existing loading docks without extensive structural modifications.

A similar object of the invention is to provide a device which may be readily utilized in conjunction with other loading dock equipment such as dock levelers and the like without interfering with the operation of the loading dock.

A further object of the invention is to provide a device which is not hazardous to either personnel or the vehicle.

Still another object of the invention is to provide a device which may be remotely operated and controlled and which may be effectively secured against unauthorized use.

It is also an object of the invention to provide a device which is simple, sturdy and easy to maintain.

In accordance with one embodiment of the invention, a device is provided for restraining a truck from movement during the loading and unloading thereof while the truck is parked in a driveway adjacent a loading dock. The truck restraining device has a lock assembly comprising a base and a locking arm pivotally mounted to the base for rotating between a retracted inoperative and an extended operative position. In the retracted position, the locking arm is substantially horizontal for permitting the truck to drive over the restraining means whereas, in the extended position, the locking arm extends upwardly for engaging the truck wheels for restraining movement of the truck. The locking arm has a front end adapted to pivotally mount to the base and a rear end adapted to engage the wheel in the extended position.

Means is provided for rotating the locking arm between the retracted and the extended positions. In one embodiment, the rotating means comprises a crank operatively connected to the locking arm by a crank drive shaft and link means. The drive shaft has a first end rigidly connected to the crank and a second end rigidly attached to link means which, in turn, is pivotally attached to the locking arm so that the locking arm rotates in response to the rotation of the crank.

Means is provided for positioning the lock assembly between a distal or forward position and a proximal or rearward position and for assuming an intermediate position disposed between the distal and proximal positions in which the lock assembly engages the wheel. The positioning means comprises a lead screw extending between the distal and proximal positions and disposed substantially perpendicular to the upright wall of the loading dock and means for rotatably driving the lead screw. The locking means is operatively connected to the lead screw for linear movement along the lead screw between the distal and proximal positions in response to the rotation of the lead screw. The preferred driving means is a motor.

Means is provided for controlling the position of the lock assembly between the distal and proximal positions in a programmed manner. The controlling means can: (1) automatically position the lock assembly at the distal position after the locking arm is rotated from the extended position to the retracted position; (2) automatically position the lock assembly at the distal position after the lock assembly has reached the proximal position; (3) automatically deactivate the positioning means when the lock assembly is immobile; (4) automatically deactivate the synchronous motor after the current or the torque of the motor reaches a predetermined value.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 6 is a top view of the cover means and the carriage assembly;

FIG. 7 is a cross-sectional view taken along line 7—7 in FIG. 6 illustrating the drive link connected to the positioning means;

FIG. 8 is a cross-sectional view taken along line 8—8 in FIG. 6 illustrating the drive link connected to the crank of the rotating means;

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
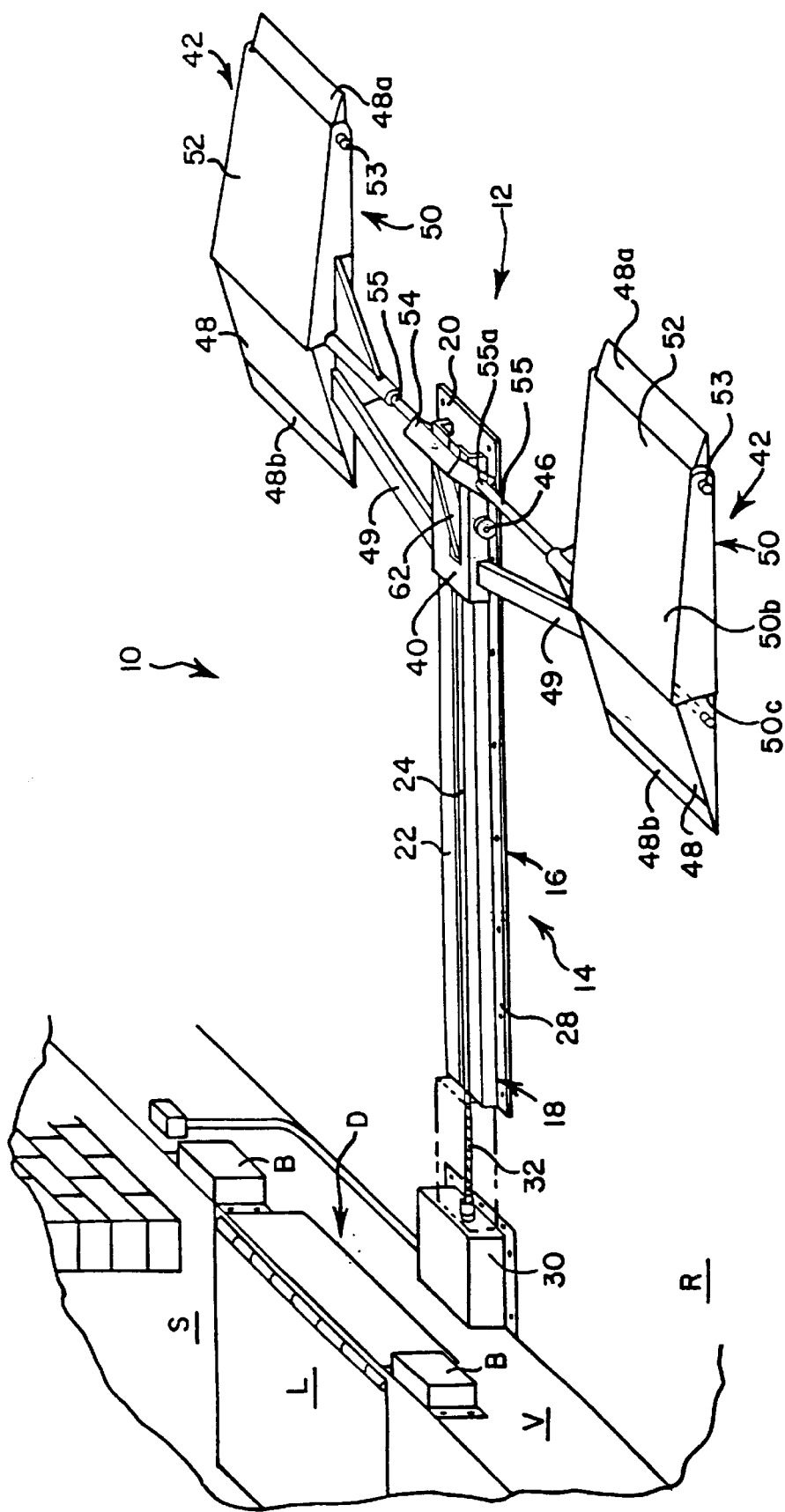
FIG. 1 is a perspective view of the vehicle restraining device in accordance with the invention disposed adjacent a conventional loading dock.

Referring to the drawings and more particularly to FIG. 1, one embodiment of the vehicle restraining device 10 in accordance with the invention is shown installed on a conventional loading dock roadway R normally provided at warehouses, truck terminals, manufacturing plants and the like where raw materials and products are received and/or dispatched by truck vehicles.

The conventional loading dock D is normally provided with a horizontal surface or deck S over which loading equipment such as forklift trucks and the like and dock personnel maneuver during the loading and unloading operation. The dock D is typically provided with a leveler assembly L which is adapted to compensate for height differentials between the deck S and the upper supporting surface of the truck bed (not shown). The mechanism (not shown) for effecting adjustment of the leveler assembly L is customarily disposed within a pit formed in the deck S of the dock D and is well known in the art. In addition, the dock D normally includes a vertical wall V or surface against which the rear end of the truck abuts during the loading and unloading operations. The surface V is provided with suitable bumpers B or fenders which are engaged by the rear of the vehicle thereby preventing damage or defacement of either the dock D or the vehicle when the vehicle is backing into position. The vehicle restraining device 10 is intended to effectively and readily secure the truck in proper position relative to the dock D and prevent the truck from inadvertently moving away from the dock D during the loading and unloading operation.

The vehicle restraining device 10 comprises restraining means 12 for engaging at least one of the truck wheels W (FIG. 2) and for securing the truck from movement, positioning means 14 for positioning the restraining means 12 between distal and proximal positions relative to the dock wall V and an intermediate position between the distal and proximal positions for engaging the wheels W after the truck is parked adjacent the loading dock D, and controlling means for determining the position of the restraining means 12 between the distal and proximal positions and positioning the restraining means 12 in a programmed manner.

In the illustrated embodiment, the vehicle restraining device 10 is generally disposed in the center of the driveway R adjacent the loading dock D so that the truck may drive over the restraining device 10 during the parking operation. The restraining device 10 has a generally T-shape formed by the positioning means 14, and the restraining means 12 projecting laterally from the positioning means 14 for selectively engaging each set of rear wheels W on each side of the truck.

The positioning means 14 comprises a carriage assembly 16 adapted for slidably receiving the restraining means 12 for movement between the proximal and distal ends 18, 20 of the carriage assembly 16 and means for moving the restraining means 12 along the carriage assembly 16. The carriage assembly 16 is fixedly disposed on the driveway so that its longitudinal axis is generally perpendicular to the dock wall V and it will be generally parallel to the longitudinal axis of the truck when the rear of the truck is adjacent the loading dock D. In a preferred embodiment illustrated in FIGS. 1 and 7–9, the carriage assembly 16 has a base 22 which is adapted to slidably receive the restraining means 12 and a channel 24 disposed along the length of the base 22 for housing a lead screw 26 for driving the restraining means 12 as described below. The carriage assembly 16 may be fixedly attached to the driveway in any conventional manner. In the illustrated embodiment, for example, a plurality of bolts 28 fixedly attach the base 22 to the surface of the driveway so that the channel 24 is above grade. In another embodiment illustrated in FIG. 10, the positioning means comprises a channel 124 formed below the driveway grade and adapted to receive the lead screw 126 therein.

In the preferred embodiment, the means for moving the restraining means 12 between the distal and proximal ends 18, 20 of the carriage assembly 16 comprises a synchronous motor 30 operatively attached by a flexible drive cable 32 to the lead screw 26. As the motor 30 rotates the cable 32 and the lead screw 26, a lead nut 34 threadedly attached to the lead screw 26 and a cam follower 36 are linearly positioned along the length of the lead screw 26. By attaching the restraining means 12 to the lead nut 34 and cam follower 36 as described below, it will be appreciated that the restraining means 12 may be positioned between the proximal and distal ends 18, 20 of the carriage assembly 16. In the illustrated embodiment, the motor 30 is disposed at the base of the loading dock D but it may be located in any convenient location. Although a synchronous motor 30 and lead screw 26 are preferred, it will be appreciated that the positioning means 14 may comprise other types of actuators such as, for example hydraulic or pneumatic actuators, a chain drive or other types of electromechanical actuating mechanisms which are known in the art.

Although the restraining means 12 may only have one lock assembly 42 for selectively engaging one of the wheels W on either side of the truck, in the illustrated embodiment, the restraining means 12 comprises a pair of lock assemblies 42 which are fixedly attached to the cover means 40 and spaced on either side of the carriage assembly 16 for selectively engaging the respective wheels W on either side of the truck. Referring to FIGS. 6–8, it will be seen that the cover means 40 has a top plate 40a and two depending sides 40b which slidably enclose the base 22 of the carriage assembly 16 (in the preferred embodiment in FIGS. 1 and 7–9). A slot 40c is disposed in the top plate 40a. Although not required, it may be desirable to have a plurality of wheels 46 rotatably attached to the sides of the cover means 40 in order to support the cover means 40 above the surface of the driveway 16 and to assist the movement of the cover means 40 along the length of the channel 24. Since the longitudinal axis of the carriage assembly 16 is generally parallel with the axis of the parked truck, the cover means 40 and the attached lock assembly 42 may be positioned along the axis of the truck so that the lock assembly 42 may engage the truck wheels W.

Figure 2:
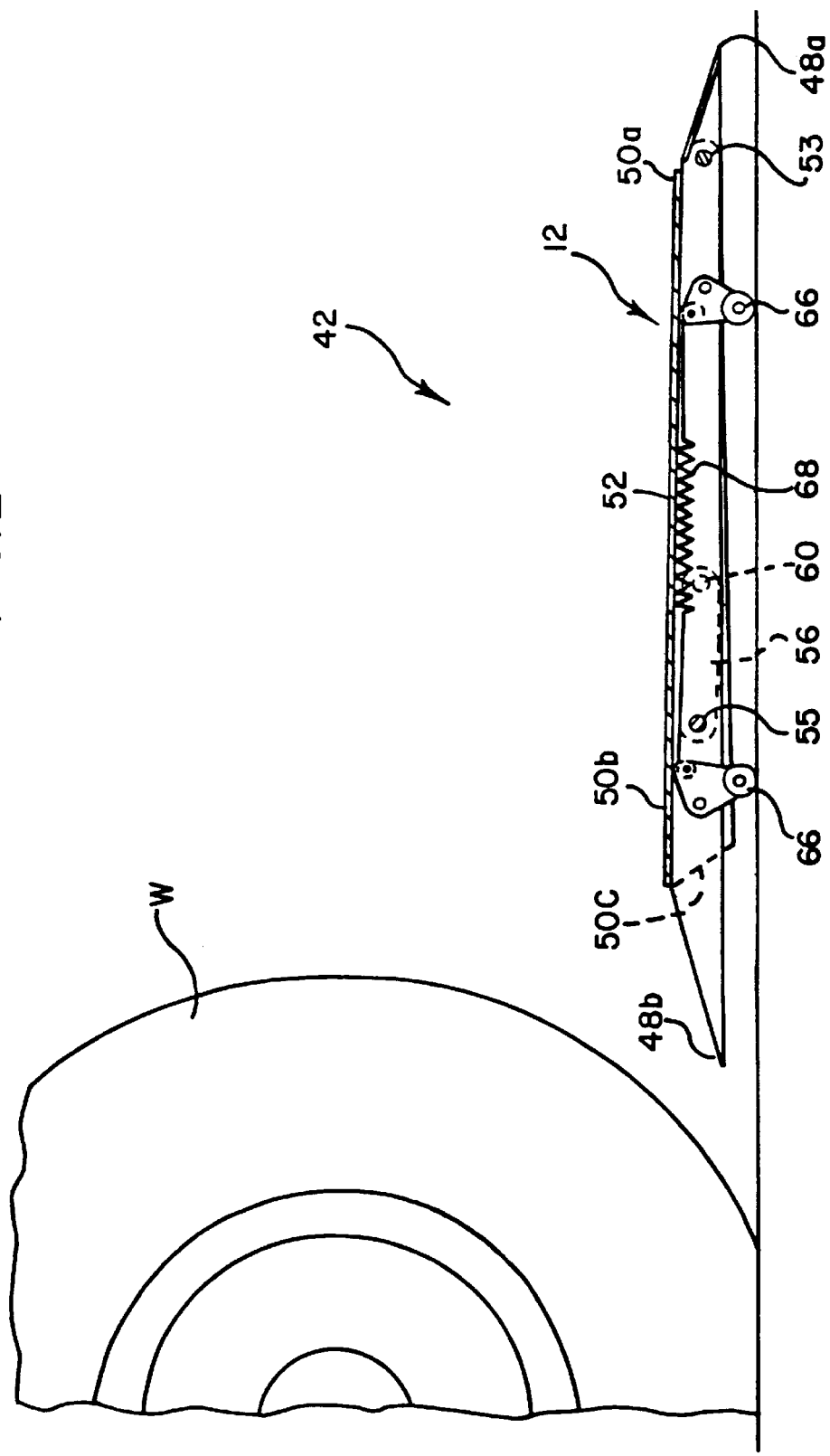
FIG. 2 is a side view of the lock assembly with the locking arm in the retracted position.
Figure 3:
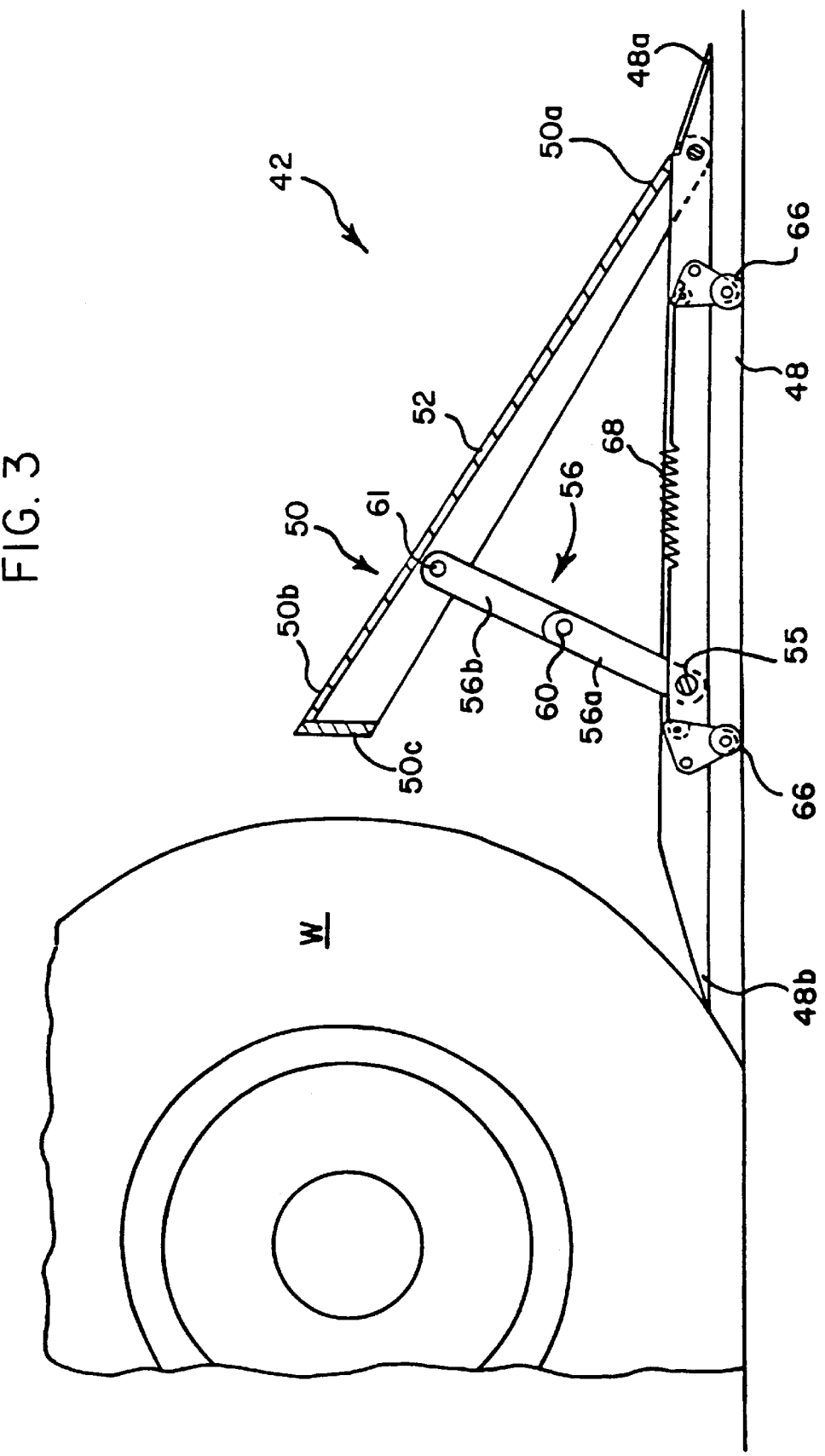
FIG. 3 is a side view of the lock assembly in the intermediate position with the locking arm in the extended position, the rear edge of the base engaging the truck wheel, and the base wheels in the active extended position.
Figure 4:
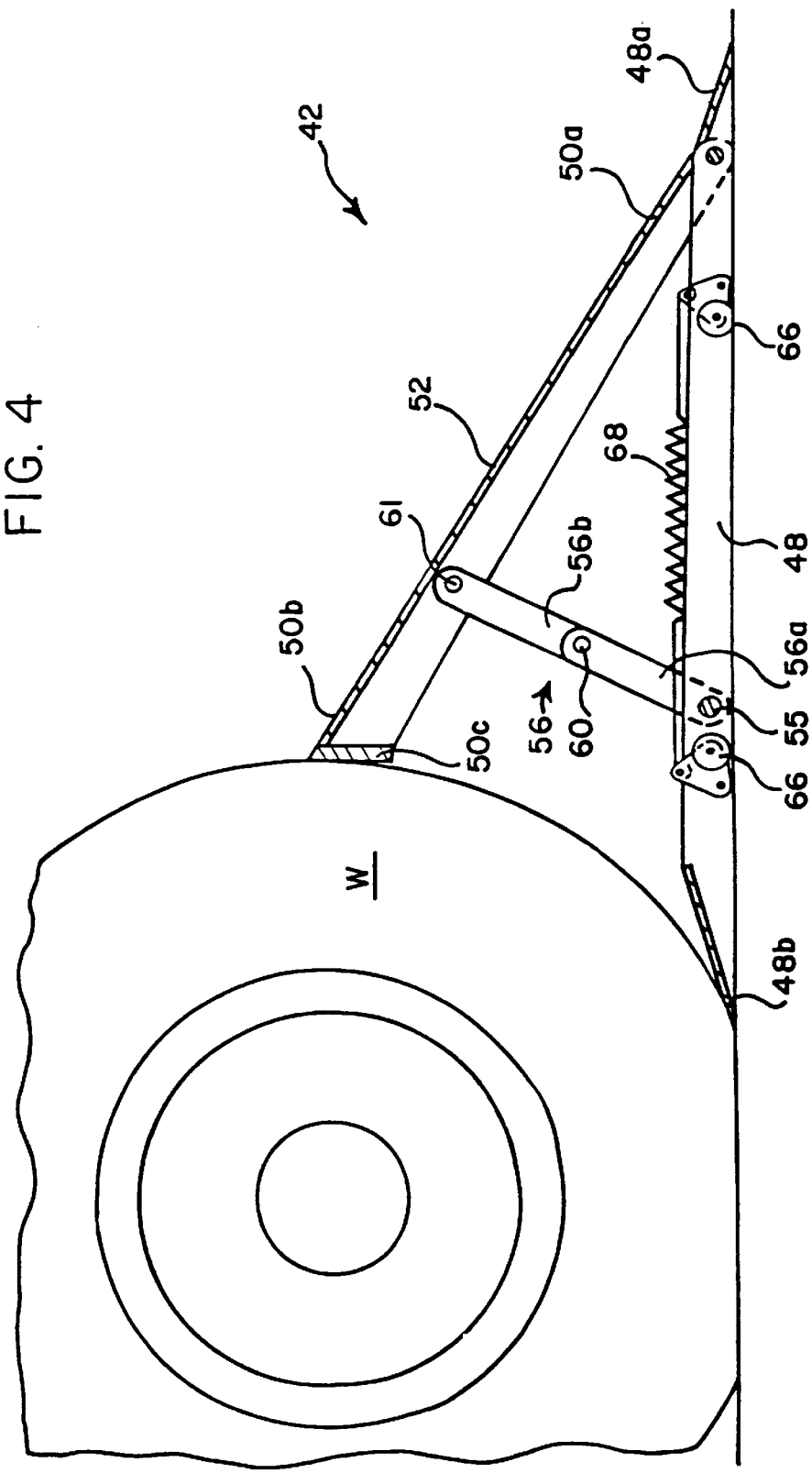
FIG. 4 is a side view of the lock assembly in the restraining position with the rear edge and the locking arm engaging the wheel.

The lock assembly 42 comprises a base 48 rigidly attached to the cover means 40 by arms 49, a locking arm 50 pivotally attached to the base 48 for rotating between a retracted storage position shown in FIG. 2, an intermediate preparatory position shown in FIG. 3, and an extended restraining position shown in FIG. 4, and rotating means for rotating the locking arm 50 between the retracted and extended positions. In accordance with one of the objects of the invention, the lock assembly 42 has a relatively low, horizontal profile in the retracted position (FIG. 2) which permits trucks having low undercarriages to pass over the restraining means 12 during the parking operation. Similarly, the base 48 has a front edge 48a and a rear edge 48b which are generally wedge-shaped to permit the truck to readily drive thereover when the lock assembly 42 is in the retracted position (FIG. 2). The lock assembly may also act as a speed bump to slow the truck parking in the loading dock area. In the extended position (FIG. 4), the locking arm 50 projects upwardly in order to create a barrier preventing the truck from inadvertently driving forward during the loading and unloading operation. In accordance with another object of the invention, the lock assembly can restrain trucks with or without an ICC bumper. Furthermore, the wedge shape permits the rear edge 48b of the base 48 to wedge underneath the wheel W when the lock assembly 42 is in the extended position (FIG. 4). Referring to FIG. 3, it will be seen that the rear edge 48b of the base 48 extends past the rearmost position of the rear end 50b of the locking arm 50 so that the truck wheel W will not interfere with the rotation of the locking arm 50 between the retracted and the extended positions.

In the preferred embodiment, the locking arm 50 comprises a plate 52 having a front end 50a pivotally attached to the front edge 48a of the base 48 at pin 53. The rear end 50b of the locking arm 50 is free to rotate from the retracted position to the extended position for directly engaging the wheel W. The rear end 50b of the locking arm 50 preferably has a relatively flat or slightly curved face 50c adapted to engage the face of the truck wheel W. In another embodiment (not shown), the rear end 50b of the locking arm 50 may be pivotally attached to the base 48 so that when the front end 50a rotates from the horizontal retracted position to the upwardly extended position, the face of the plate 52 directly engages the truck wheel W.

Figure 5:
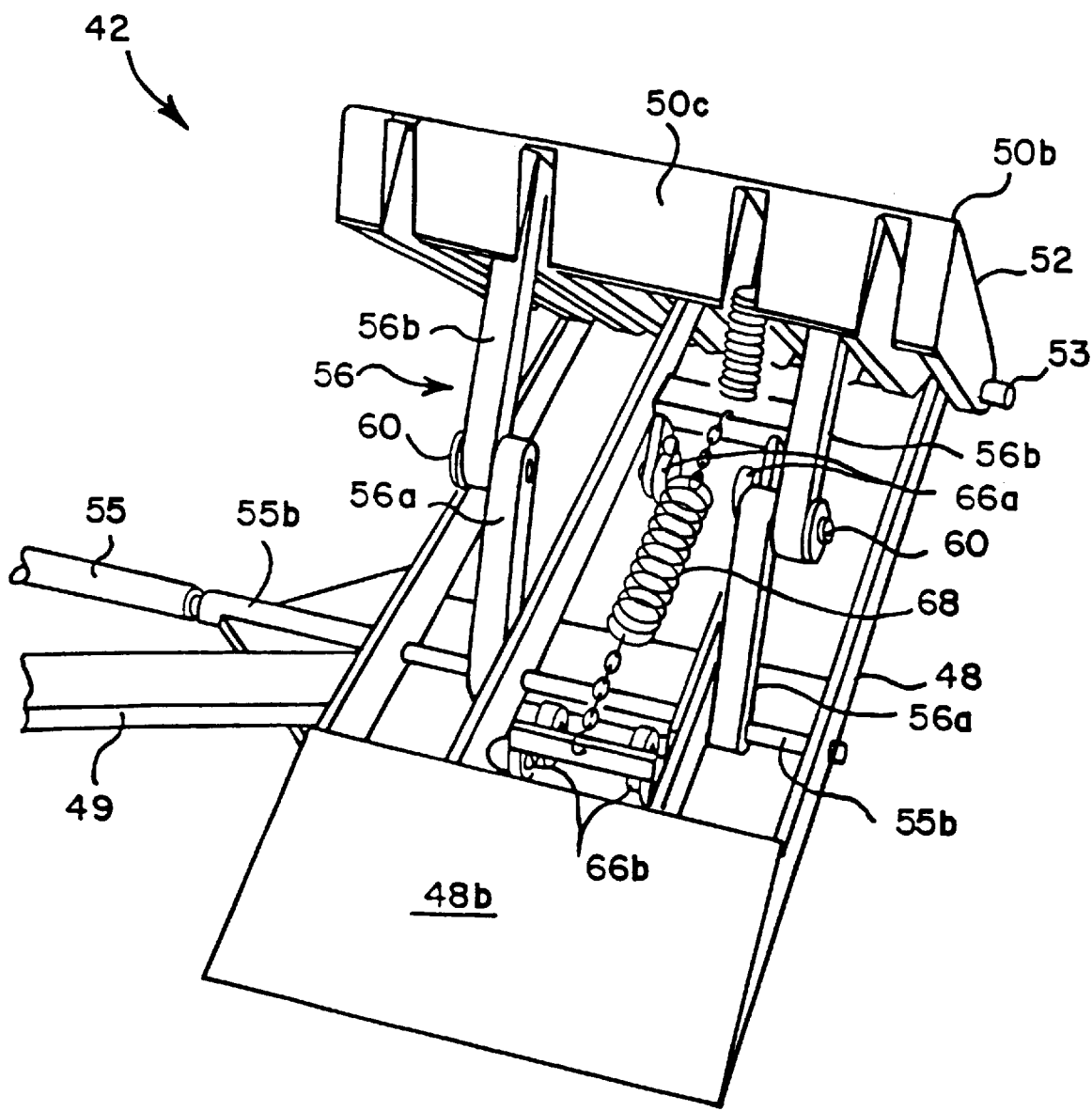
FIG. 5 is a perspective view of the lock assembly.
Figure 9:
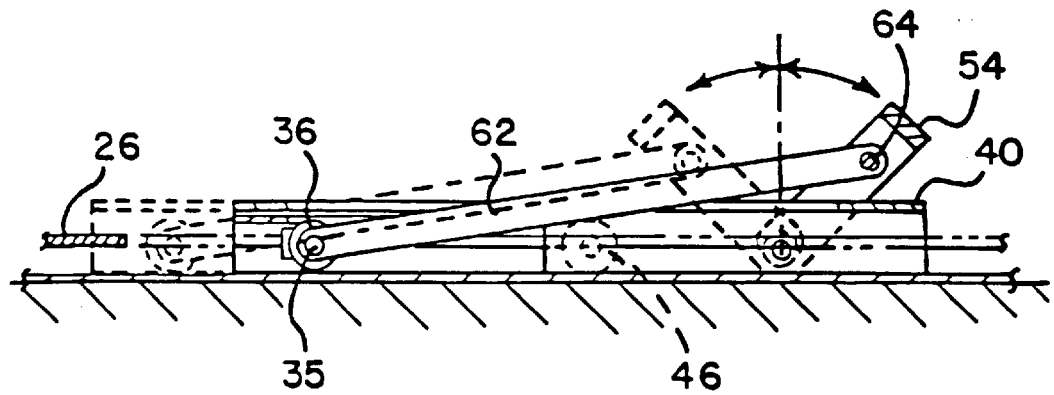
FIG. 9 is an end view of one embodiment of the positioning means illustrating the carriage assembly and the channel disposed above grade.

In order to rotate the locking arm 50 between the retracted position shown in FIG. 2 and the extended position shown in FIG. 4, the rotating means comprises a crank 54 operatively connected to the locking arm 50 by crank drive shafts 55 and link means 56 best shown in FIGS. 1 and 5–6. The crank drive shaft 55 has one end 55a rigidly attached to the crank 54 and a second end 55b operatively attached to the rear end 50b of the locking arm 50 by link means 56. In the embodiment illustrated in FIG. 5, the link means 56 comprises a first link 56a rigidly attached to the drive shaft 55 and rotatably attached to a second link 56b at pin 60. The second link 56b, in turn, is pivotally attached to the rear end 50b of the locking arm 50 at pin 61. Referring to FIG. 9, it will be seen that the crank 54 is movable between a retracted position shown in solid lines and an extended position shown in phantom lines. When the crank 54 rotates in the counterclockwise direction as viewed in FIG. 9, the crank drive shaft 55 and the link means 56 rotate the locking arm 50 from the retracted position (FIG. 2) to the extended restraining position (FIG. 4).

In order to rotate the crank 54 between the retracted and the extended positions, the crank 54 is operatively connected to the positioning means 14. In the illustrated embodiment, the drive link 62 operatively connects the crank 54 and the positioning means 14 and is able to push or pull the lock assembly 42 between the proximate and distal positions 18, 20. Referring to FIGS. 1 and 6–9, it will be seen that the drive link 62 passes through the slot 40c in the cover means so that first end 62a of the drive link 62 is generally disposed above the cover means 40 for pivotally connecting to the crank 54 at pin 64 and the second end 62b is generally disposed inside the channel 24 of the carriage assembly 16 for pivotally attaching to the lead nut 34 and cam follower 36 at pin 35. After the drive link 62 pulls the lock assembly 42 into engagement with the truck wheel W, the drive link 62 continues pulling so that the drive link 62 rotates in the counterclockwise direction and the crank 54 rotates the locking arm 50 from the retracted position (FIG. 2) into the extended position (FIGS. 3, 4). When the drive link 62 pushes the lock assembly 42 away from the truck wheel W, the drive link 62 initially pushes the crank 54 in the clockwise direction, rotating the locking arm 50 from the extended position (FIGS. 3, 4) to the retracted position (FIG. 2). It will also be appreciated that when the drive link 62 operatively connects the restraining means 12 and the positioning means 14, the restraining means 12 may be positioned between the proximal and distal ends 18, 20 of the carriage assembly 16 as discussed above.

It will be appreciated that different trucks will have different wheel sizes. Thus, the lock assembly 42 may have sizing means for automatically accommodating different size wheels. In one embodiment, the sizing means comprises a plurality of base wheels 66 pivotally mounted to the base 48 for rotating between an active position and a collapsed position. In the active position, the wheels 66 support the base 48 of the lock assembly 48 above the driveway as shown in FIGS. 2–3 when the locking assembly 42 is moving between the distal and proximal positions 18, 20. In the collapsed position, the base 48 of the lock assembly rests upon the driveway as shown in FIG. 4. Referring to FIG. 5, there is shown a pair of front and rear wheels 66a, 66b pivotally mounted to the base 48 and a tension spring 68 connecting the front and rear wheels 66a, 66b. The force of the spring 68 is sufficient to force the wheels 66 to rotate to the active position so that the restraining means 12 may be readily positioned underneath the truck. In order to accommodate different wheel sizes, the positioning means 14 forces the rear edge 48b of the base 48 into engagement with the truck wheels W so that the force exerted on the lock assembly 42 by the positioning means 14 overcomes the spring force, the base wheels 66 rotate towards the collapsed position and the base 48 is lowered toward the driveway until the face 50c of the locking arm 50 engages the face of the wheel. For large wheels, the face 50c will typically engage the wheel before the base 48 engages driveway. In extreme situations, for smaller wheels, the base 48 will collapse so that it rests on the driveway and rear edge 48b of the base 48 wedge underneath the wheel W, as shown in FIG. 4. When the positioning means 14 terminates the pulling force and disengages the lock assembly 42 from the truck wheel W, the spring force is sufficient to extend to base wheels 66 so that the base 48 is raised to its highest position above the ground.

In operation, the truck is parked in the loading dock D in the conventional manner so that the rear edge of the truck abuts the bumpers B. The lock assembly 42 is typically stored at the distal position 20 of the carriage assembly 16 in the retracted position. It will be appreciated that the low profile of the restraining device 10 will not interfere with the parking operation and the truck may readily drive over the wedge-shaped lock assembly 42.

After the truck is parked, the operator activates the positioning means 14 which moves the lock assembly 42 from the distal end 20 of the carriage assembly 16 to the intermediate position wherein the lock assembly 42 engages the truck wheel W. In the preferred embodiment, the motor 30 rotatably drives the flexible cable 32 and lead screw 26 which linearly positions the lead nut 34 and cam follower 36 within the channel 24. Thus, the lead screw 26 pulls the drive link 62 operatively connecting the lead screw 26 and the locking assembly 42. The base wheels 66 support the locking assembly 42 above the driveway from the distal end 20 of the carriage assembly 16 to the intermediate position wherein the rear end 48b of the base 48 initially engages the truck wheel W as shown in FIG. 3.

Although the rearward movement of the lock assembly 42 is substantially terminated at the intermediate position, the lead screw 26 continues pulling the drive link 62 thereby rotating the crank 54 in the counterclockwise direction. The counterclockwise rotation of the crank 54 rotates the crank drive shaft 55 and the link means 56, thereby rotating the locking arm 50 from the retracted position shown in FIG. 2 to the extended position in FIGS. 3–4. It will be appreciated that the rear end 48b of the base 48 extends past the rearmost position of the locking arm 50 so that the locking arm 50 may rotate upwardly without engaging the truck wheel W. In the intermediate position shown in FIG. 3, the base 48 of the lock assembly 42 is supported above the driveway and the rear edge 48b engages the truck wheel W so that the face 50c of the locking arm 50 cannot yet engage the truck wheel W. The sizing means permits the lock assembly 42 to adjust its position to automatically accommodate different size truck wheels W. The positioning means 14 continues pulling the lock assembly 42 into engagement with the truck wheel W until the force is sufficient to overcome the force of the spring 68, thereby collapsing the base wheels 66. As the base wheels 66 collapse, the base 48 descends toward the driveway permitting the lead screw 26 to continue pulling the face 50c of the lock assembly 42 into secure engagement with the truck wheel W. The face 50c of the locking arm 50 will securely engage the wheel W thereby preventing the truck from movement during the loading/unloading operation. After the lock assembly 42 has securely engaged the wheel W, the positioning means 14 is automatically deactivated.

After the loading or unloading operation is completed, the dock operator activates the motor 30 which rotates the flexible cable 32, the lead screw 26 and forces the lead nut 34 towards the distal end 20 of the carriage assembly 16. Initially, the lock assembly 42 securely engages the truck wheel W so that the locking arm 50 cannot rotate from the extended position to the retracted position. Therefore, the motor continues driving the lock assembly 42 towards the distal end 20 until the locking arm 50 disengages the wheel W. After the locking arm 50 has disengaged the wheel W, the drive link 62 rotates the crank 54 in the clockwise direction from the extended position, thereby closing the lock assembly 42. Similarly, the spring 68 rotates the base wheels 66 into the active position which raises the base 48 above the driveway so that the lock assembly 42 may readily be positioned to the distal end 20 of the carriage assembly 16 for the next vehicle. In the retracted position, the truck may drive over the restraining means 12 and depart from the loading dock.

Controlling means is provided for determining the position of the restraining means 12 between the distal and proximal ends 18, 20 of the carriage assembly 16 and the position of the lock assembly 42 between the retracted and extended positions and then for positioning the restraining means 42 in a programmed manner. In a preferred embodiment, the controlling means determines whether the position of the restraining means 12 is at the proximal or distal ends 18, 20 of the carriage assembly 16 and whether the restraining means 12 is stationary and whether the locking arm 50 is retracted or extended. In a normal inactive mode, it is preferable that the restraining means 12 be positioned at the distal end 20 of the carriage assembly 16 when the restraining device 10 is not actively being utilized, so that the restraining means 12 may be positioned from the distal end 20 towards the proximal end 18 to engage the truck wheels W somewhere therebetween. For similar reasons, it is undesirable that the restraining means 12 be stored at the proximal end 18 of the carriage assembly 16 in the storage position because, once the truck is parked in the loading dock D, the lock assembly 42 can not be positioned to the front of the truck wheels W without removing the truck from the loading dock D. Thus, the carriage assembly 16 has distal end indicator means (not shown) for indicating when the restraining means 12 is at the distal end 20 and proximal end indicator means (not shown) for indicating when the restraining means 12 is at the proximal end 18 of the carriage assembly 16. The indicator means may be connected to the controlling means in any conventional manner including, for example, a continuous switch or wire means located in the carriage assembly 16. The controlling means will deactivate the motor 30 when the distal end indicator means indicates that the restraining means 12 is positioned at the distal end 20 in the normal storage mode. If the restraining means 12 reaches the proximal end 18, for example, when a truck is not parked in the loading dock D, the controlling means will automatically return the restraining means 12 to the storage position at the distal end 20 of the carriage assembly 16 for the next incoming vehicle. In the event that the restraining means 12 is positioned at the proximal end 18 after a truck is parked in the loading position and the dock personnel has attempted to activate the restraining device 10, the controlling means may activate an alarm indicating that the restraining device 12 can not properly restrain the truck from movement.

The restraining means 12 will typically be stationary when it engages a truck wheel W or other immovable obstacle or when an object is resting on the restraining means 12. In the preferred embodiment, the controlling means monitors the synchronous motor 30 which will indicate that the restraining means 12 is stationary when the motor torque or current increases to a predetermined value. If the dock personnel activates the restraining device 10 but the restraining means 12 can not move because, for example, the truck wheel is sitting on the restraining means 12, the controlling means will automatically deactivate the motor 30 and sound an alarm.

In order to measure the position of lock assembly 42 between the retracted and extended positions, a position sensor means (not shown) may be mounted to the restraining means 12. In a preferred embodiment, the position sensor means may be mounted to the crank 54, the drive link 62, or the locking arm 50 to indicate when the respective member is positioned between the retracted or the extended positions. In the event that the locking arm 50 does not rotate to the retracted position in a predetermined time interval, say about two seconds, after the dock personnel deactivates restraining device 10 at the completion of the loading or unloading operation so that the truck can leave the loading dock D, the controlling means may sound an alarm indicating that the truck may not attempt to drive over the restraining means 12. Similarly, the controlling means may sound an alarm if the locking arm 50 is in the extended position at the distal end 20 of the carriage assembly 16 indicating that the truck should not enter the loading dock D.

Figure 10:
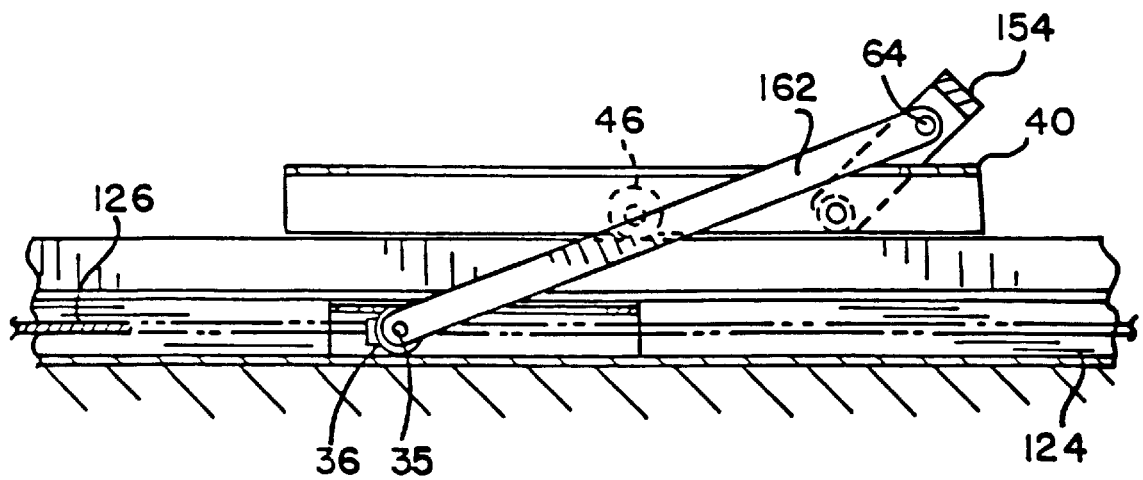
FIG. 10 is an end view of another embodiment of the positioning means illustrating the channel disposed below grade.
Figure 11:
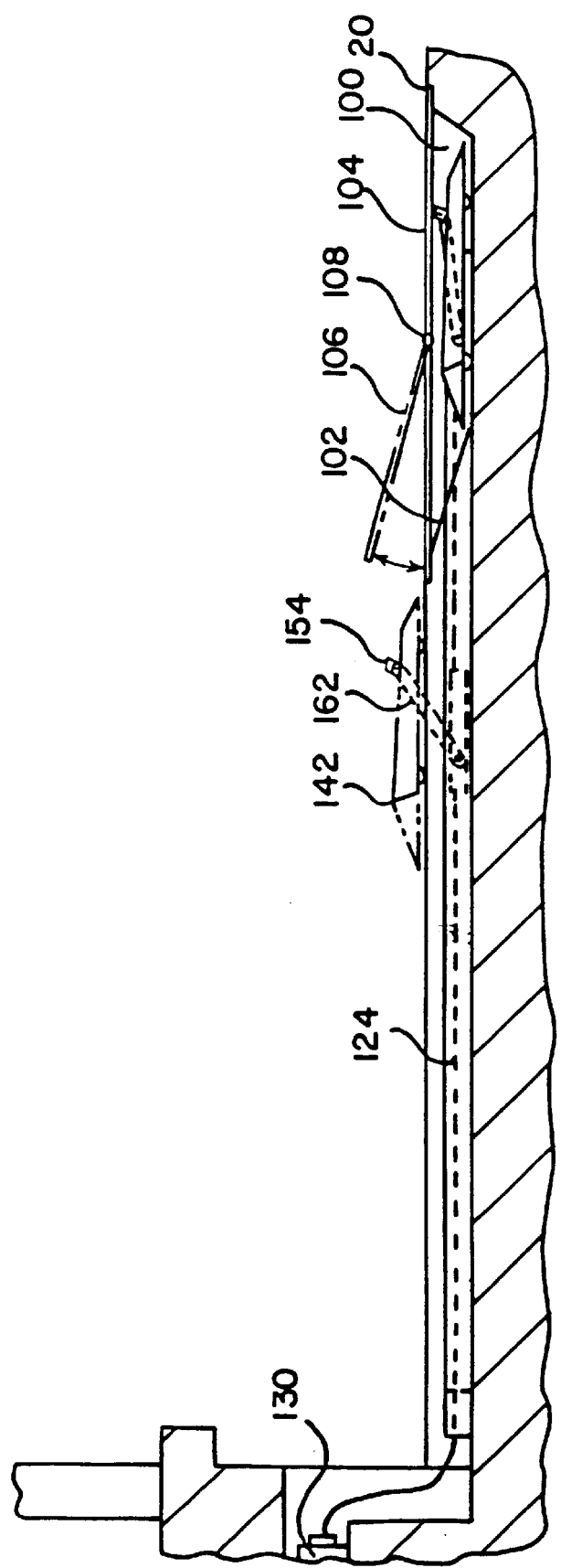
FIG. 11 is a side elevational view of another embodiment of the vehicle restraining device illustrating the lock assembly stored below grade.

FIGS. 10–11 illustrate another embodiment of the restraining device in which the lock assembly 142 is stored below driveway grade instead of above grade as shown in FIGS. 1–9. The positioning means comprises a channel 124 disposed below grade and adapted to receive the lead screw therein. A storage chamber 100 for storing the lock assembly 142 below grade is disposed at the distal end 20 of the driveway. The storage chamber 100 has a ramp 102 permitting the lock assembly 142 to travel between the driveway and the storage chamber 100, a steel cover 104 and trap door 106 for covering the storage chamber 100. The lock assembly 142 operates as described above although it will be appreciated that the drive link 162 will have to be long enough to connect the crank 154 and the lead screw 126 after the lock assembly 142 is above grade as illustrated in FIG. 10. FIG. 11 also illustrates the motor 130 remotely located from the channel 124 and lead screw 126.

In order to engage the truck wheels, the positioning means including the drive link 162 and the crank 154 pulls the lock assembly 142 resting in the storage compartment rearwardly so that the lock assembly 142 travels up the ramp 102 and pivots the trap door 106 open about pivot pin 108. After the lock assembly 142 is disposed on the driveway surface, it operates as previously described. In order to store the lock assembly 142, the positioning means transports the lock assembly towards the distal position 20 and the storage chamber 100. The trap door 106 can be opened either by dock personnel or by other conventional means known in the art.

We claim as our invention:

1. A vehicle restraining device for engaging at least one wheel of a vehicle parked on a roadway disposed adjacent a structure and generally defining a plane, to prevent movement of the vehicle relative to the structure, the restraining device comprising:

a locking assembly including a locking arm comprising a plate defining a distal and a proximal end relative to the structure, the plate being movable between a lowered position wherein the plate is disposed substantially parallel to the plane, and a fully raised position wherein the plate forms an acute angle with the plane, which angle faces toward the structure, the proximal end of the plate being spaced from the roadway and disposed adjacent the wheel and the distal end being disposed adjacent the roadway when the plate is in the fully raised position, the locking assembly also being movable toward and away from the structure; and a drive means operatively connected to the locking assembly to move the locking arm toward and away from the structure.

2. The restraining device of claim 1, and including a base disposed adjacent the roadway and extending along a line from a proximal to a distal position relative to the structure, wherein the locking assembly includes a cover which moves over the base, and wherein the locking arm is disposed laterally of the line, the cover and locking arm being coupled such that the locking arm moves along the base as the cover moves over the base.

3. A vehicle restraining device for engaging at least one wheel of a vehicle parked on a roadway disposed adjacent a structure and generally defining a plane, to prevent movement of the vehicle relative to the structure, the restraining device comprising:

a locking arm comprising a plate defining a distal and proximal end relative to the structure, the plate being movable between a lowered position wherein the plate is disposed substantially parallel to the plane, and a fully raised position wherein the plate forms an acute angle with the plane, which angle faces toward the structure, the proximal end of the plate being spaced from the roadway and disposed adjacent the wheel and the distal end being disposed adjacent the roadway when the plate is in the fully raised position, the locking arm also being movable toward and away from the structure; and a drive means operatively connected to the locking arm to move the locking arm toward and away from the structure.

4. A vehicle restraining device for engaging at least one wheel of a vehicle parked on a roadway disposed adjacent a structure and generally defining a plane, to prevent movement of the vehicle relative to the structure, the restraining device comprising:

a locking assembly including a plate defining a distal and a proximal end relative to the structure, the plate being movable between a lowered position wherein the plate is disposed substantially parallel to the plane, and a fully raised position wherein the plate forms an acute angle with the plane, which angle faces toward the structure, the proximal and distal ends of the plate maintaining their respective positions relative to the structure as the plate moves from the lowered position to the fully raised position, the locking assembly also being movable toward and away from the structure; and a drive means operatively connected to the locking assembly to move the plate toward and away from the structure.

5. A vehicle restraining device for engaging at least one wheel of a vehicle parked on a roadway disposed adjacent a structure and generally defining a plane, to prevent movement of the vehicle relative to the structure, the restraining device comprising:

a locking arm defining a distal and a proximal end relative to the structure, the locking arm being lovable between a lowered position wherein the locking arm is disposed substantially parallel to the plane, and a fully raised position wherein the locking arm forms an acute angle with the plane, which angle faces toward the structure, the proximal and distal ends of the locking arm maintaining their respective positions relative to the structure as the locking arm moves from the lowered position to the fully raised position, the locking arm also being movable toward and away from the structure; and a drive means operatively connected to the locking arm to move it toward and away from the structure.

* * * * *